United States Patent
Lin et al.

(10) Patent No.: US 9,769,466 B2
(45) Date of Patent: Sep. 19, 2017

(54) DIGITAL CINEMA PROJECTION METHOD, OPTIMIZATION DEVICE AND PROJECTION SYSTEM

(71) Applicant: CHINA FILM DIGITAL GIANT SCREEN (BEIJING) CO., LTD., Beijing (CN)

(72) Inventors: Minjie Lin, Beijing (CN); Wei He, Beijing (CN)

(73) Assignee: CHINA FILM DIGITAL GIANT SCREEN (BEIJING) CO., LTD, Beijing (CN)

(*) Notice: Subject to any disclaimer, the term of this patent is extended or adjusted under 35 U.S.C. 154(b) by 423 days.

(21) Appl. No.: 14/398,716

(22) PCT Filed: Jul. 5, 2013

(86) PCT No.: PCT/CN2013/078936
§ 371 (c)(1),
(2) Date: Nov. 3, 2014

(87) PCT Pub. No.: WO2014/005553
PCT Pub. Date: Jan. 9, 2014

(65) Prior Publication Data
US 2015/0097932 A1    Apr. 9, 2015

(30) Foreign Application Priority Data
Jul. 6, 2012  (CN) .......................... 2012 1 0235830

(51) Int. Cl.
*H04N 13/00*    (2006.01)
*G09G 3/00*    (2006.01)
(Continued)

(52) U.S. Cl.
CPC ......... *H04N 13/0459* (2013.01); *G03B 21/32* (2013.01); *G09G 3/002* (2013.01);
(Continued)

(58) Field of Classification Search
None
See application file for complete search history.

(56) References Cited

U.S. PATENT DOCUMENTS 5,850,297 A * 12/1998 Honda ............... H04N 1/00795
                                               358/474
7,677,737 B2 * 3/2010 Lonn .................... H04N 9/3173
                                               345/589
(Continued)

FOREIGN PATENT DOCUMENTS

CN         201110939 Y    9/2008
CN         102821285 A    12/2012
(Continued)

OTHER PUBLICATIONS

International Search Report for corresponding International Application No. PCT/CN2013/078936 dated Oct. 3, 2013.

*Primary Examiner* — Reza Aghevli
(74) *Attorney, Agent, or Firm* — Billion & Armitage; Benjamin C. Armitage; Michael A. Collins (57) ABSTRACT

Embodiments of the present invention provide a digital cinema projection method comprising the following steps: projecting images to a screen by a digital cinema projector, and acquiring the images on the screen by an image capture unit; performing digital analysis on the acquired images by an image analysis unit to obtain a plurality of parameters of the acquired images; according to each of the parameters, performing correction process on image signals input from the digital cinema server, and then outputting to the digital cinema projector; and projecting the differently corrected and improved images targeted to each of the digital cinema projectors.

6 Claims, 6 Drawing Sheets

(51) Int. Cl.
*H04N 13/04* (2006.01)
*G03B 21/32* (2006.01)
*H04N 9/31* (2006.01)

(52) U.S. Cl.
CPC ......... *H04N 9/3147* (2013.01); *H04N 9/3182* (2013.01); *H04N 9/3185* (2013.01); *H04N 9/3194* (2013.01); *H04N 13/0022* (2013.01); *H04N 13/0425* (2013.01); *H04N 13/0497* (2013.01); *G09G 2320/0693* (2013.01); *H04N 2013/0074* (2013.01)

(56) References Cited

U.S. PATENT DOCUMENTS

| | | | |
|---|---|---|---|
| 2004/0041981 | A1 | 3/2004 | Werner |
| 2004/0257540 | A1* | 12/2004 | Roy .................. H04N 5/74 353/69 |
| 2006/0007460 | A1* | 1/2006 | Bogdanowicz ......... H04N 9/11 358/1.9 |
| 2006/0126138 | A1* | 6/2006 | Bala .................... H04N 1/6033 358/518 |
| 2007/0091334 | A1* | 4/2007 | Yamaguchi .......... H04N 9/3182 358/1.9 |
| 2009/0207185 | A1* | 8/2009 | Furui .................... H04N 9/3185 345/619 |
| 2012/0075435 | A1* | 3/2012 | Hovanky ............... H04N 13/02 348/51 |
| 2012/0140096 | A1* | 6/2012 | Ostlund ................. G06F 1/1639 348/241 |
| 2012/0194562 | A1* | 8/2012 | Ivashin .................. G09G 3/001 345/672 |
| 2012/0300044 | A1* | 11/2012 | Thomas ............. H04N 13/0425 348/51 |
| 2013/0113975 | A1* | 5/2013 | Gabris .................. G03B 17/54 348/333.1 |
| 2013/0307995 | A1* | 11/2013 | Nakata ................. H04N 9/3194 348/189 |

FOREIGN PATENT DOCUMENTS

| | | |
|---|---|---|
| CN | 202841396 U | 3/2013 |
| JP | 2003-271121 A | 9/2003 |
| WO | WO 2014/005553 A1 | 1/2014 |

* cited by examiner (PRIOR ART)

DIGITAL CINEMA PROJECTION METHOD, OPTIMIZATION DEVICE AND PROJECTION SYSTEM

CROSS-REFERENCE TO RELATED APPLICATIONS

This application is a National Stage Application of PCT/CN2013/078936, filed 5 Jul. 2013, which claims benefit of Application No. 201210235830.3, filed 6 Jul. 2012 in China and which applications are incorporated herein by reference. A claim of priority to all, to the extent appropriate, is made.

TECHNICAL FIELD

The present invention relates to the technical field of image processing, particularly to a digital cinema projection method, an optimization device and a projection system.

BACKGROUND ART

Figure 1:
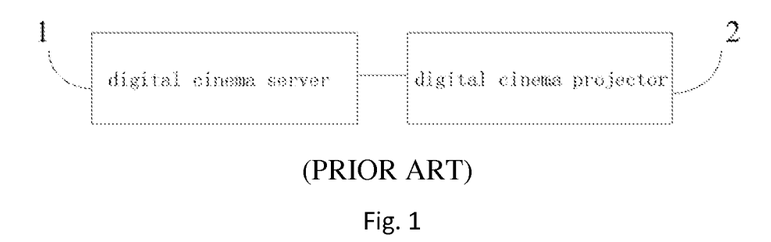
FIG. 1 is a structural schematic diagram of a digital cinema projection system in the prior art.

A digital cinema projection system in a cinema generally includes one digital cinema server and two or more digital cinema projectors. The digital cinema server and the digital cinema projectors are connected with signal transmission lines, as shown in FIG. 1. The digital cinema server is used for storing, playing and managing motion picture contents. The projector projects and displays, in form of light, on the screen the broadcast content after receiving it from the server through signal lines. In the projection of stereo movies, two projectors can be used to project left and right eye images respectively, achieving effect of stereo projection by the methods such as polarization.

Since conditions such as architectural characteristics and geometry shapes of auditorium of different cinemas, screen shapes, characteristics of projectors are inconsistent, when the relative positions and angle of projection optic axis and the screen are not sufficiently aligned, it is easy to cause deformation of the pictures for the reasons such as curvature of the screen, if two projectors project identical pictures, a certain degree of ghosting may appear. When projecting a stereo program, relative deformation of the left and right eye images will occur, causing fatigue in viewing.

A stereo digital cinema projection system usually uses a metal screen with high gain, in order to maintain the polarization of light and increase the brightness. When the projected pictures are shown on the metal screen with high gain, since reflection of non-diffuse-reflectance material has certain directionality, unevenness of brightness and color will occur.

In addition, because two or more projection systems have performance differences, there is inconsistency of image appearances such as color and brightness between two or more pictures. In the projection of stereo pictures, this inconsistency will result in degradation of projection quality, also causing the fatigue in viewing. Moreover, measurements such as contrast and sharpness between the pictures projected by a common projection system and a movie source are exactly the same, without mechanism to further improve the picture quality.

In summary, in the projection system of the prior art, for the reasons such as relative positions and angle of the projection optical axis and specific screen characteristics, curvature of the screen and its own non-diffuse-reflection characteristic, and the performance differences between different projectors, the picture quality of images projected by the projection system of the prior art is not high, so the projection system of the prior art has a problem of not guaranteeing the quality of the projected images.

SUMMARY

The present invention provides a digital cinema projection method, an optimization device and a projection system so as to solve the problem of not guaranteeing the quality of the projected images in the prior art.

In order to achieve the above objective, the technical solutions of the present invention are implemented as follows.

A digital cinema projection method comprises the following steps:

A, projecting images to a screen by a digital cinema projector, and acquiring the images on the screen by an image capturing unit;

B, performing digital analysis on the acquired images by an image analysis unit to obtain a plurality of parameters of the acquired images;

C, according to each of the parameters, performing correction and improvement process on image signals input from the digital cinema server, and then outputting to the digital cinema projectors; and D, projecting the corrected images by the digital cinema projector.

Here, in the steps A and B, the images are testing images projected before projecting a movie; and in the steps C and D, the images are movie images projected during playback the movie;

Alternatively, in the steps A and B, the images are images being projected during projecting the film; and in the steps C and D, the images are images to be projected during projecting the film.

Here, in the steps A and B, if the images are testing images projected before projecting a film, the step of projecting images to the screen by the digital cinema projector comprises: projecting the testing images which at least comprise monochromatic testing images.

Here, the step B comprises the following steps: analyzing the monochromatic testing images in the current projection environment to obtain two parameters, namely, brightness and color uniformity; analyzing the testing images by using local patterns added on the monochromatic testing images to obtain shooting parameters of focus and aperture of the image capture unit; analyzing geometry, image sharpness and contrast of the monochromatic testing image and comparing it with the original pictures output from the server, to obtain such parameters as geometrical deformation, image sharpness and contrast.

Here the step C comprises the following steps: according to one or more of the parameters of shooting parameters, brightness, color uniformity, geometry, image sharpness and contrast, performing one or more compensation on brightness, color uniformity, geometry, image sharpness and contrast of the image signals input from the digital cinema server, and then outputting the image signals to the digital cinema projector.

The present invention also provides a digital cinema optimization device, comprising an image capture unit, an image analysis unit and an image processing unit; the image capture unit acquires images on a screen; the image analysis unit makes digital analysis on the acquired images and obtains a set of parameters of the acquired images; the image processing unit is electrically connected between a digital cinema server and a digital cinema projector, performs correction and improvement processes on image signals input from the digital cinema server according the set of parameters and then outputs to the digital cinema projector.

In the above, the digital cinema optimization device further comprises an image transmission unit, which is electrically connected between the image capture unit and the image analysis unit and configured to convert the images acquired by the image capture unit to those in data format compatible with the image analysis unit and transmit the same to the image analysis unit.

Here, the image analysis unit is configured for analyzing the monochromatic testing images in current projection environment to obtain two parameters of brightness and color uniformity; analyzing the testing image by using local patterns added on the monochromatic testing images to obtain shooting parameters of focus and aperture of the image capture unit; analyzing geometry, image sharpness and contrast of the monochromatic testing image and comparing with original pictures output from the server to obtain parameters of geometry, image sharpness and contrast.

The present invention also provides a digital cinema projection system comprising the digital cinema optimization device, a digital cinema server and a digital cinema projector; the digital cinema optimization device is electrically connected between the digital cinema server and the digital cinema projector.

In the above, the image analysis unit and the image processing unit of the digital cinema optimization device are integrated into one device, and/or the image processing unit of the digital cinema optimization device is integrated in the digital cinema projector or integrated in the digital cinema server.

It can be seen that the present invention at least has the following beneficial effects.

With the digital cinema projection method, the optimization device and the projection system according to the present invention, the images being projected on the screen are acquired and analyzed, and according to the analysis results, the images to be projected are corrected and then displayed by the digital cinema projectors. Thus, the image is rectified and improved, ensuring the quality of projected images.

BRIEF DESCRIPTION OF DRAWINGS

In order to describe more clearly the technical solutions of the embodiments of the present invention or in the prior art, the drawings to be used in the description of the embodiments or the prior art will be briefly introduced in the following. Obviously, the drawings described below are some embodiments of the invention, and for one skilled in the art, in the premise of not paying creative work, other drawings can also be obtained according to these drawings.

DETAILED DESCRIPTION OF EMBODIMENTS

In order to make the objectives, technical solutions and advantages of the embodiments of the present invention more clarified, in the following, the technical solutions of the embodiments of the present invention will be described clearly and completely in conjunction with the drawings in the embodiments of the present invention. Obviously, the described embodiments are only part of the embodiments of the present invention, but not all of the embodiments. Based on the embodiments of the present invention, all other embodiments obtained by one skilled in the art without paying creative work all belong to the scope of protection of the present invention.

Figure 2:
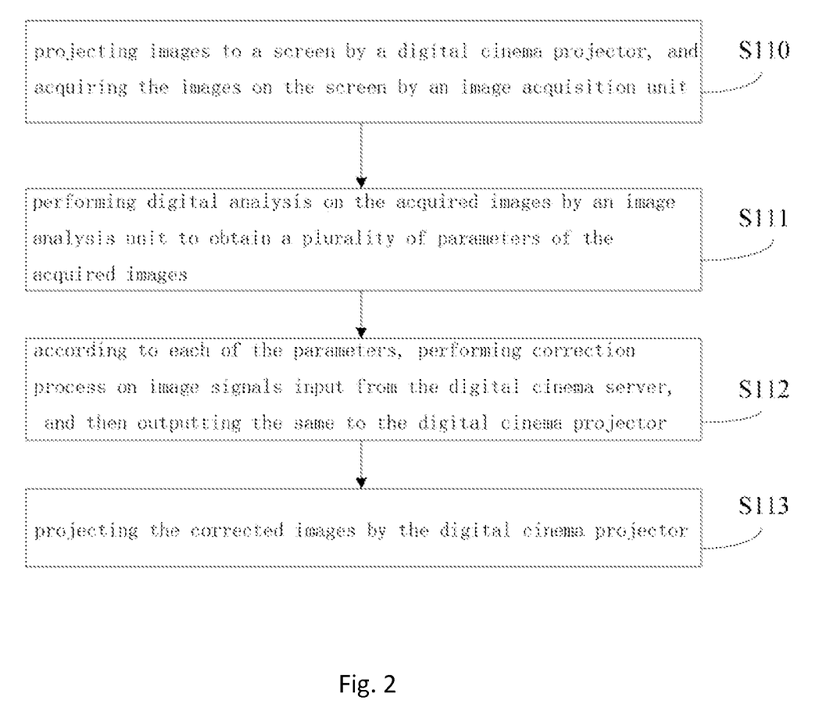
FIG. 2 is a flow chart of a digital cinema projection method according to the present invention.

The present invention provides a digital cinema projection method, as shown in FIG. 2, comprising the following steps:

Step S110, projecting images to a screen by a digital cinema projector, and acquiring the images on the screen by an image capture unit.

In the digital cinema projection method according to the present invention, before an image is projected by the digital cinema projector, image processing parameters are obtained by projecting specific testing images and acquiring and analyzing the testing images, thus, actual images to be projected may be subsequently corrected and processed according to the analysis result of the testing images; in addition, in the embodiment of the present invention, image pictures being projected can be collected discontinuously or in real-time during the projection process to obtain the image processing parameters, and then images subsequently projected in real-time are corrected and processed dynamically, for example, by acquiring and analyzing the image of the previous frame, an image of the next frame is corrected, etc. One of the two methods can be used or both of them can be used in combination.

Preferably, in the present embodiment, the digital cinema projector projects the testing images to the screen before projecting the motion picture contents, and the image capture unit acquires the testing images on the screen.

The testing images include, but are not limited to, monochromatic testing images such as red, green, blue, black, white, grey and the like. Through analysis on these monochromatic testing images, features such as image brightness and color uniformity of pictures with different colors and brightness under specific projection environment, in specific projection systems and with specific screen characteristics can be obtained.

The testing images for extracting brightness and color uniformity are monochromatic testing images, and the testing images for extracting other parameter indices may be testing images such as chessboard and Moore patterns. According to the technical conception of the present invention, one skilled in the art can select suitable testing images for testing according to actual situations, which is not limited in the present invention.

If local patterns such as lines and color lumps are added on the monochromatic images for testing, it is easier for the image capture unit to obtain shooting parameters including, but not limited to, focus and aperture.

Step S111, performing digital analysis on the acquired images by an image analysis unit to obtain a plurality of parameters of the acquired images.

The analysis process specifically includes: analyzing the monochromatic testing images with different colors under the specific projection environment to obtain the parameters of brightness and color uniformity; analyzing the testing image by using the local patterns added on the monochromatic testing images to obtain shooting parameters of the image capture unit such as focus and aperture, and at the same time, analyzing geometry, image sharpness and contrast of the monochromatic testing image and comparing with original pictures output from the server.

Figure 3:
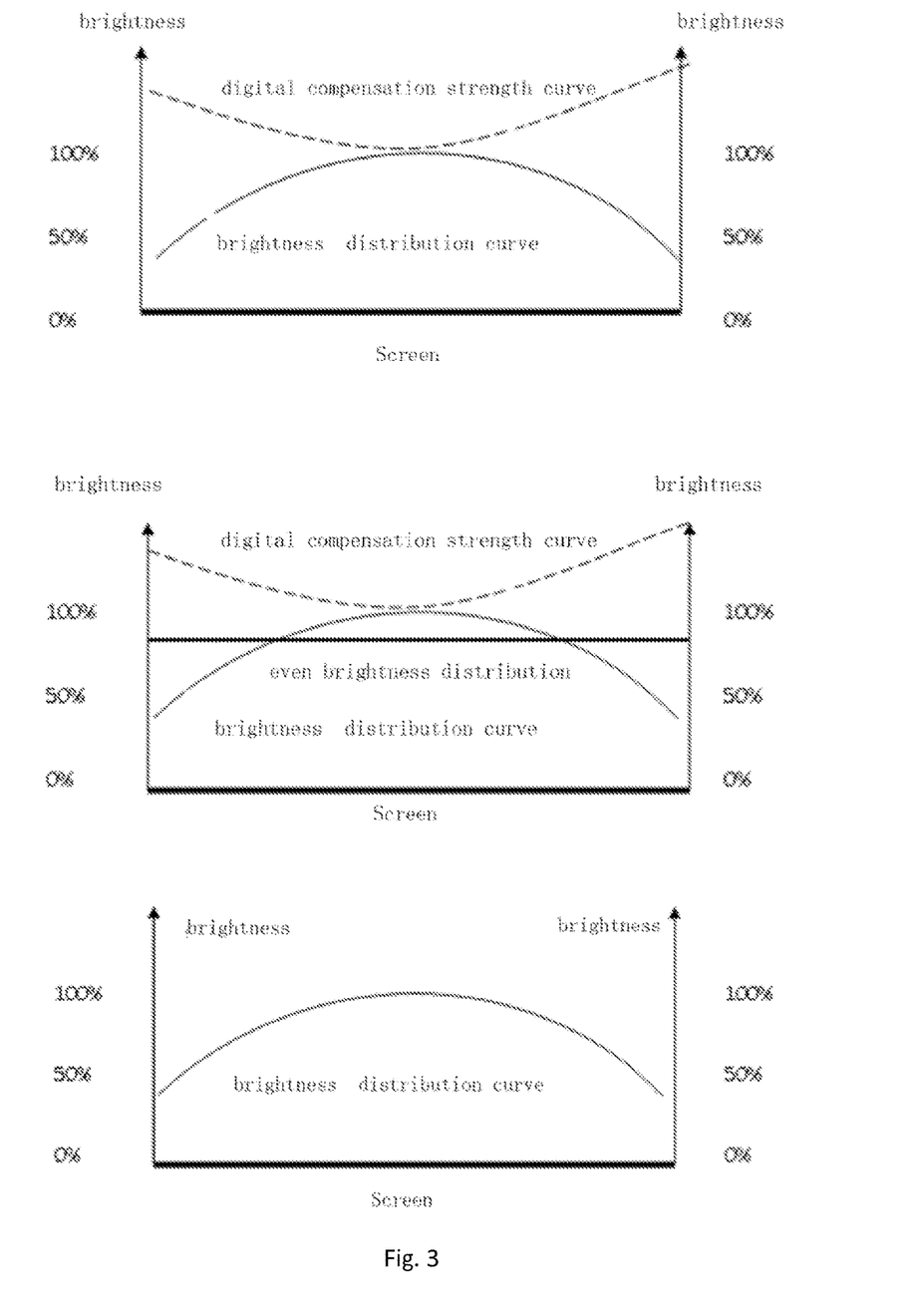
FIG. 3 is a schematic diagram of a brightness distribution curve and a compensation curve according to the present invention.

Uniformity refers to inconsistency of the pictures on different regions of a display device, possibly resulting from attributes and characteristics of a picture display device, such as a screen, a projector, etc. For example, the monochromatic pictures are displayed on the screen, which renders the inconsistency of image properties, such as colors, brightness, etc., between different regions of the screen, mostly in form of slight difference of brightness and color. In the digital cinema projection method of the present invention, brightness and uniformity analysis is made on the obtained image pictures to obtain tendency of difference of brightness and uniformity, and compensation of brightness and uniformity is made for the difference of brightness and uniformity through video processing to improve brightness and uniformity of the pictures. Taking compensation of brightness as an example, as shown in FIG. 3, FIG. 3 is a schematic diagram of the brightness distribution curve and the compensation curve.

Compensation of brightness and uniformity can ensure projection brightness when two or more projectors project a planary or stereo movie, increase uniformity of image properties such as color, brightness of the projection pictures on the screen, and decrease occurrence of mismatch of picture properties such as color, brightness and the like between a plurality of projection pictures when a plurality of projectors project plane or stereo pictures at the same time.

Meanwhile, analysis on geometry deformation is also carried out. Geometry deformation refers to geometry difference between the pictures and the source pictures possibly resulting from attributes and characteristics of a picture display device, such as a screen, a projector, etc. The system of the present invention compares the collected pictures and the source pictures and makes deformation analysis, and performs geometry correction or process on the pictures through video processing. When performing the geometry deformation analysis on the images, meshes may be added on the monochromatic testing images to make the deformation of the images more obvious and easier to be captured.

Thus, geometry deformation of the projected pictures can be reduced, and it can be ensured that no relative geometry deformation occurs between the plurality of projected pictures when the plurality of projectors project plane or stereo pictures at the same time.

For image sharpness analysis, the image pictures acquired by an image acquisition device such as a video camera or a photographic camera are compared to the source pictures and the sharpness analysis is made, and sharpness correction of the pictures is carried out through video processing.

For image contrast analysis, the image pictures acquired by an image acquisition device such as a video camera or a photographic camera are compared to the source pictures and the contrast analysis is made, and contrast correction of the pictures is carried out through video processing.

Step S112, according to each of the parameters, image signals input from the digital cinema server 1 undergo the correction process, and then are output to the digital cinema projector.

According to the parameters such as shooting parameters, brightness, color uniformity, geometry, image sharpness and contrast, compensations of brightness, color uniformity, geometry, image sharpness and contrast are made to the image signals input from the digital cinema server, and then the image signals are output to the digital cinema projector.

Step S113, the digital cinema projector projects the corrected images.

In the present invention, through the analysis and process on the projected images, picture properties such as geometry, color, brightness, contrast and the like of the projected images are changed so as to improve the picture quality or viewing effect of ordinary 2D movie or 3D stereo movie.

Figure 4:
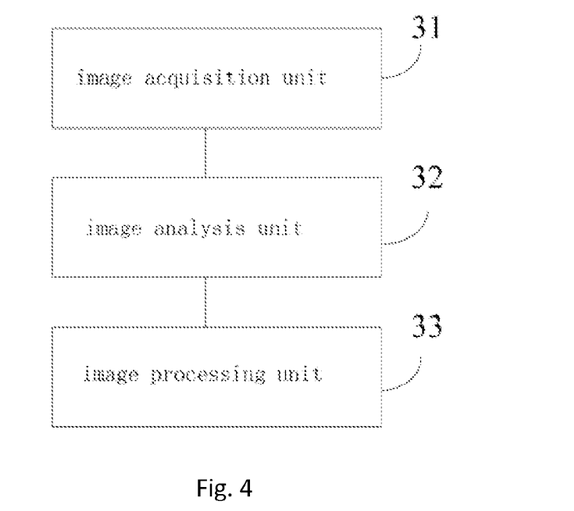
FIG. 4 is a structural schematic diagram of an embodiment of a digital cinema optimization device according to the present invention.

An embodiment of the present invention provides a digital cinema optimization device which is electrically connected between a digital cinema server 1 and a digital cinema projector 2.

As shown in FIG. 4, an image capture unit 31, an image analysis unit 32 and an image processing unit 33 are included.

The image capture unit 31 is configured to acquire images on a screen and has functions of acquiring digitally a film or testing pictures projected by a projection system.

In the present embodiment, the image capture unit 31 is one or more video cameras or photographic cameras. Image signals acquired by the video cameras or photographic cameras are output to the image analysis unit 32 by a network cable or a USB interface.

Figure 5:
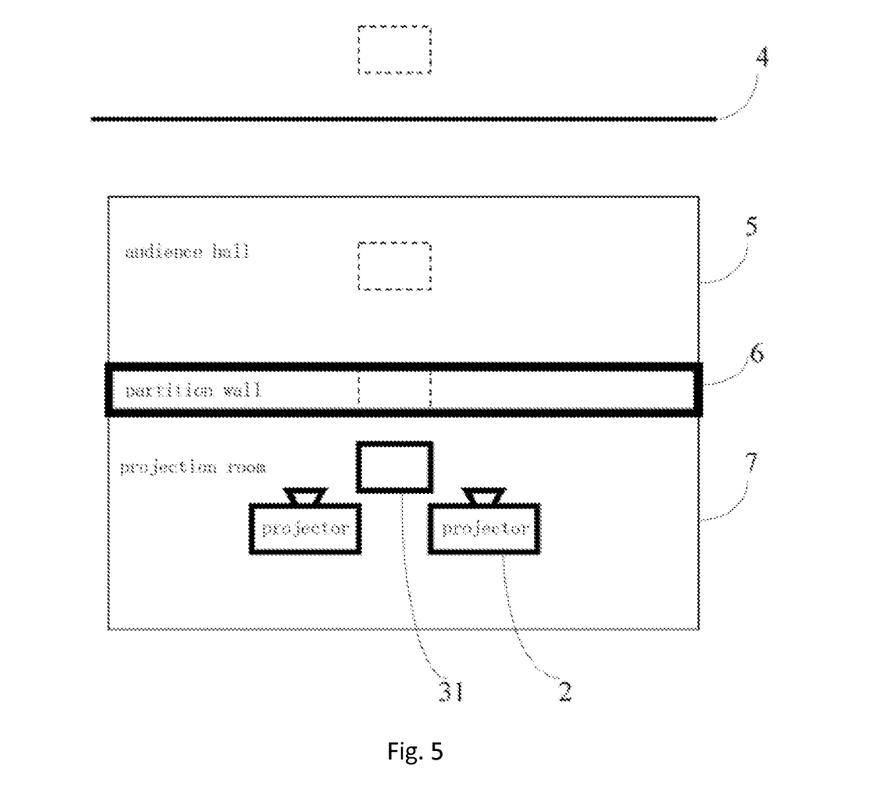
FIG. 5 is a schematic diagram of a placement position of an image capturing unit of the digital cinema optimization device according to the present invention.

Preferably, the image capture unit 31 may be mounted at a position near an optical path of the projector to achieve an objective of efficiently acquiring the projected pictures. As shown in FIG. 5, the image capture unit may be mounted in a projection booth 7 or a auditorium 5, or near or at the back side of the screen 4, or built in a partition wall 6, for example, in the wall between the projection booth 7 and the auditorium 5, and an opening is provided at the side facing the auditorium 5 to acquire the projected pictures on the screen 4, and the opening may be closed by a normal or optical glass to achieve functions of dustproof and protection.

The image analysis unit 32 is configured to make digital analysis on the acquired images and obtain a plurality of parameters of the acquired images.

The plurality of parameters comprise one or more of the following parameters: shooting parameters, brightness, color uniformity, geometry, image sharpness and contrast.

The image processing unit 33 is electrically connected between the digital cinema server 1 and the digital cinema projector 2, and configured to perform correction process on the image signals input from the digital cinema server 1 according to the individual parameters and then output the same to the digital cinema projector 2.

Figure 6:
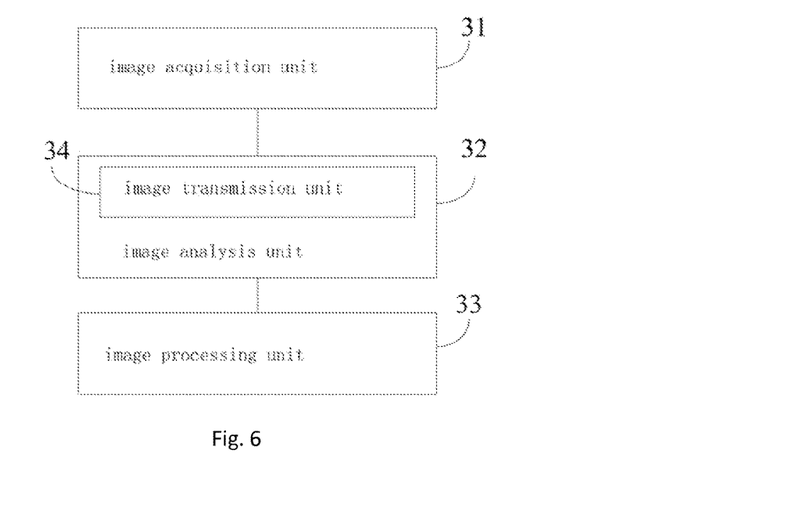
FIG. 6 is a structural schematic diagram of another embodiment of the digital cinema optimization device according to the present invention.

Preferably, the digital cinema optimization device 3 further comprises an image transmission unit 34.

The image transmission unit 34 is electrically connected between the image capture unit 31 and the image analysis unit 32, and configured to convert the images acquired by the image capture unit 31 as in the data format compatible with the image analysis unit 32 and transmit the same to the image analysis unit 32.

As shown in FIG. 6, in the present embodiment, the image transmission unit 34 is integrated into the image analysis unit 32.

Since a data output interface of the video camera or photographic camera is incompatible with a data input interface of the image analysis unit 32, when the images taken by the video camera or photographic camera are transmitted to the image analysis unit 32, their data format should be converted, and such process of data conversion may be completed by a chip integrated in the image analysis unit 32 or by a USB wire which itself has data conversion function.

After the images are acquired by the image capture unit 31, they are transmitted to the image analysis unit 32 by the image transmission unit 34, and the image analysis unit 32 makes the digital analysis on the acquired image pictures to obtain the analysis results as image processing parameters and basis. One or more sets of the original image pictures output from the digital cinema server 1 are processed in real-time by the image processing unit 33, such that the pictures projected by the whole set of projection system are corrected in terms of geometry, color, uniformity, contrast and the like, and thus improving the image quality.

Figure 7:
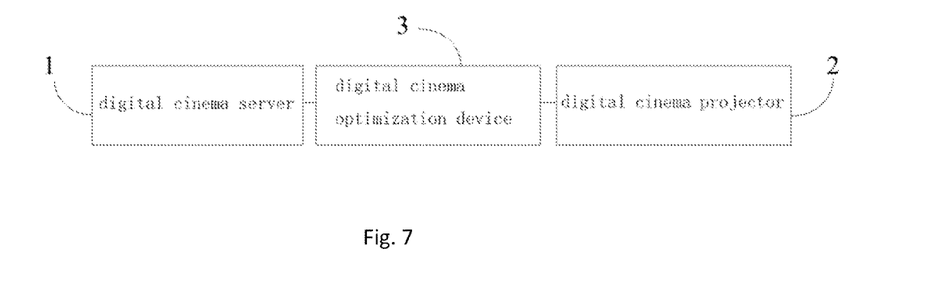
FIG. 7 is a structural schematic diagram of a digital cinema projection system according to the present invention.

An embodiment of the present invention also provides a digital cinema projection system, as shown in FIG. 7, comprising the digital cinema optimization device 3, a digital cinema server 1 and a digital cinema projector 2.

The digital cinema optimization device 3 is electrically connected between the digital cinema server 1 and the digital cinema projector 2.

Figure 8:
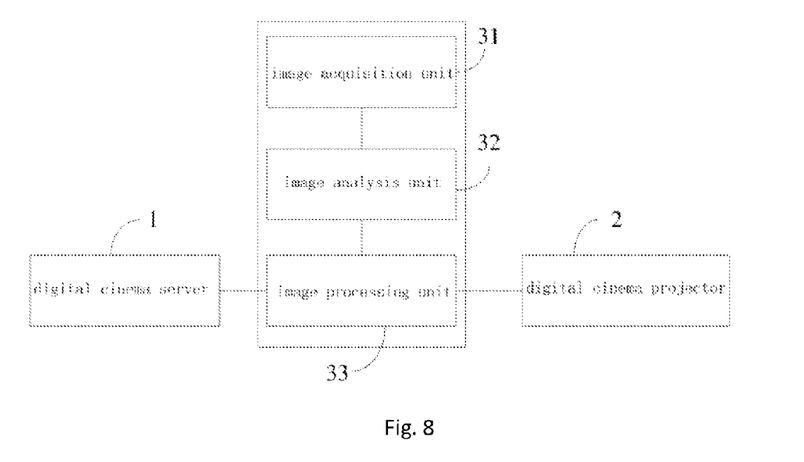
FIG. 8 is a structural schematic diagram of an embodiment of the digital cinema projection system according to the present invention.

As shown in FIG. 8, as an embodiment, the image analysis unit 32 and the image processing unit 33 of the digital cinema optimization device 3 are integrated into one device. For example, they may be integrated in a same computer or server.

Figure 9:
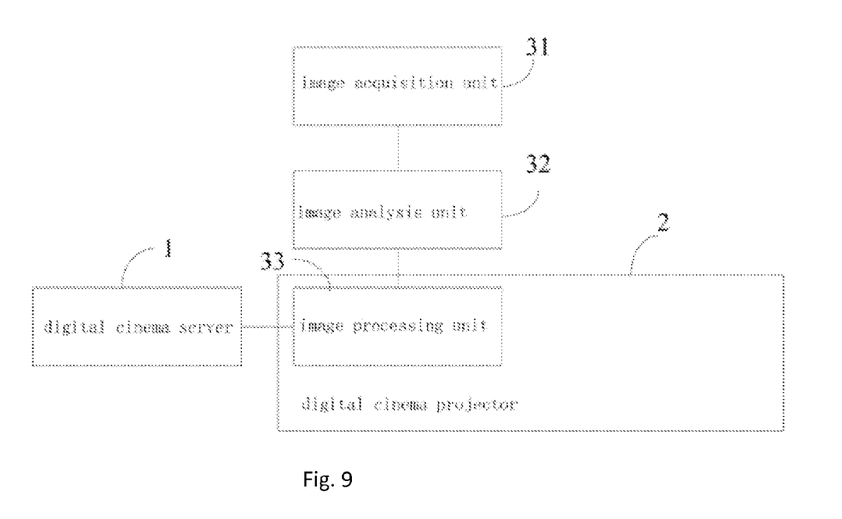
FIG. 9 is a structural schematic diagram of another embodiment of the digital cinema projection system according to the present invention.

As an embodiment, the image processing unit 33 can use an electronic circuit based on micro processor or FPGA (Field-Programmable Gate Array) to achieve its function of real-time processing. Preferably, in the present embodiment, the image processing unit 33 of the digital cinema optimization device 3 may be integrated in the digital cinema projector 2, that is, the mode of a system including a set of image acquisition and analysis unit 32 and plural sets of image processing units 33 may be used, wherein each image processing unit 33 may be integrated respectively in each digital cinema projector 2, as shown in FIG. 9.

Figure 10:
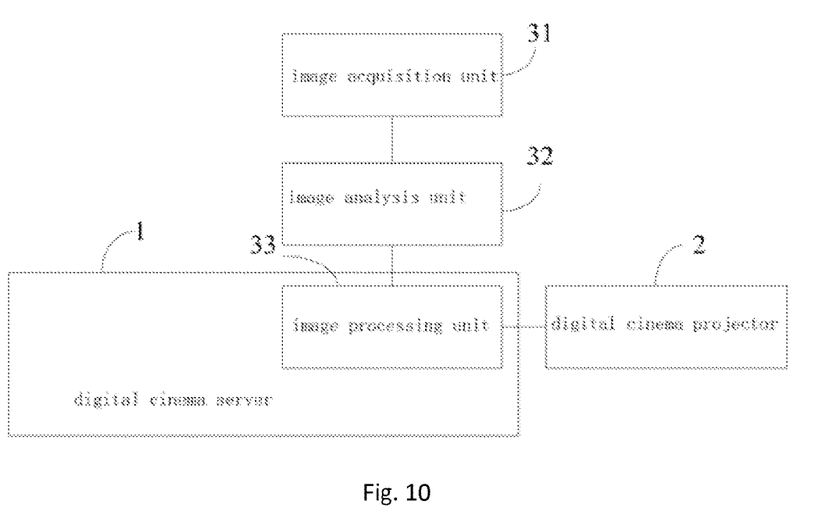
FIG. 10 is a structural schematic diagram of yet another embodiment of the digital cinema projection system according to the present invention.

As shown in FIG. 10, as an embodiment, the image processing unit 33 may be built in the digital cinema server 1, for real-time processing the film contents output from the digital cinema server 1 to achieve the effects of correction and improving the image quality.

Obviously, according to the technical conception of the present invention, one skilled in the art can slightly alter the connection relations and the setting positions between various functional modules of the digital cinema projection system, to obtain other embodiments than the above several embodiments, all belonging to the protection scope of the present invention.

In the digital cinema projection system of the present invention, the video camera or photographic camera device, the image analysis unit 32 and the image processing unit 33 are added between the server and the projector of the common digital cinema projection system, the image analysis unit 32 makes digital analysis on the image pictures acquired and played, to obtain quantitative features, and the image processing unit 33 performs correction and process according to the quantitative features, improving the quality of the projected pictures.

According to the digital cinema projection method, the optimization device and the projection system of the present invention, a digital video signal processing device is added between a video signal output terminal of a signal source and a video signal input terminal of a projector of the common projection system, collects the displayed pictures in real-time or non real-time, and makes analysis on the obtained video or images, and the image processing unit corrects the video signals according to the analysis results, improving image effects and quality of the whole projection system.

One skilled in the art can understand that: all or part of the steps implementing the above method embodiment may be completed by hardware related to program instructions, the above program can be stored in readable storage medium of a computer. When the program is executed, steps of the above method embodiment are executed; and the above storage medium comprises various media, such as ROM, RAM, disk or CD-ROM which can store program codes.

Finally it should be explained that the above embodiments are only to describe the technical solutions of the present invention and are not intended to limit the invention. Although detailed description are made to the present invention referring to the above embodiments, one skilled in the art can understand that the technical solutions recited in the above embodiments may be modified, or some of the technical features may be replaced equivalently; these modifications and replacements do not make the essence of the corresponding technical solutions deviated from the spirit and scope of the technical solutions of the embodiments of the present invention.

The invention claimed is:

1. A digital cinema projection method, comprising the steps:

receiving test image signals from a digital cinema server;

projecting, via a digital cinema projector, test images to a screen based on the received test image signals, wherein the test images comprise monochromatic testing images with local patterns added to the monochromatic testing images;

acquiring, via an image capture unit, the test images projected on the screen;

performing, via an image analysis unit, digital analysis on the acquired images to obtain a set of parameters of the acquired images, wherein digital analysis includes analyzing the monochromatic testing images projected on the screen with respect to a current projection environment to obtain properties of brightness and color uniformity, analyzing the testing image projected on the screen by using the local patterns added on the monochromatic testing images to obtain shooting parameters of focus and aperture of the image capture unit, and analyzing geometry, image sharpness and contrast of the testing images and comparing with original pictures output from the server to obtain parameters of geometry, image sharpness and contrast;

receiving film image signals from the digital cinema server;

according to each set of the parameters, performing correction and improvement process on image signals received from the digital cinema server, and outputting the same to the digital cinema projector, wherein correction and improvement of image signals received from the digital cinema server includes performing one or more compensation of brightness, color uniformity, geometry, image sharpness and contrast to the image signals input from the digital cinema server based on one or more of the parameters of shooting parameters, brightness, color uniformity, geometry, image sharpness and contrast; and projecting, via the digital cinema projector, the corrected, improved images to the screen.

2. A digital cinema optimization device, comprising:
an image capture unit;
an image analysis unit; and
an image processing unit;
wherein the image capture unit is configured to acquire images projected on a screen by a digital cinema projector, wherein the images are based on image signals provided by a digital cinema server and include testing images;
wherein the image analysis unit is configured to make digital analysis on the acquired images and obtain a plurality of parameters of the acquired images, wherein digital analysis includes comparing the acquired test images projected on the screen with testing images received from the server to measure a geometry deformation parameter; and
wherein the image processing unit electrically connected between the digital cinema server and the digital cinema projector is configured to correct the image signals input from the digital cinema server based on the obtained geometry deformation parameters and then output the corrected image signals to the digital cinema projector for projection onto the screen.

3. The digital cinema optimization device according to claim 2, further comprising an image transmission unit, the image transmission unit electrically connected between the image capture unit and the image analysis unit, configured to convert the images acquired by the image capture unit to as in data format compatible with the image analysis unit and then transmit the same to the image analysis unit.

4. The digital cinema optimization device according to claim 3, wherein the image analysis unit is further configured for:

analyzing the testing images under current projection environment to obtain two parameters of brightness and color uniformity; analyzing the testing image by using local patterns added on the testing images to obtain shooting parameters of focus and aperture of the image capture unit; analyzing image sharpness and contrast of the testing images and comparing with original pictures output from the server to obtain parameters of image sharpness and contrast.

5. A digital cinema projection system, comprising the digital cinema optimization device according to claim 3, a digital cinema server and a digital cinema projector, the digital cinema optimization device electrically connected between the digital cinema server and the digital cinema projector.

6. The digital cinema projection system according to claim 5, wherein the image analysis unit and the image processing unit of the digital cinema optimization device are integrated into one device, and/or the image processing unit of the digital cinema optimization device is integrated in the digital cinema server or integrated in the digital cinema projector.

\* \* \* \* \*